United States Patent
Backmann et al.

(10) Patent No.: US 11,358,324 B2
(45) Date of Patent: Jun. 14, 2022

(54) STRAINING DEVICE AND METHOD FOR EXTENDING A FILM WEB

(71) Applicant: Windmoeller & Hoelscher KG, Lengerich (DE)

(72) Inventors: Martin Backmann, Lengerich (DE); Juergen Linkies, Lienen (DE); Ingo Ruebbelke, Geseke (DE); Markus Bussmann, Essen (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 442 days.

(21) Appl. No.: 14/356,241

(22) PCT Filed: Oct. 25, 2012

(86) PCT No.: PCT/EP2012/071160
§ 371 (c)(1),
(2) Date: May 5, 2014

(87) PCT Pub. No.: WO2013/064422
PCT Pub. Date: May 10, 2013

(65) Prior Publication Data
US 2014/0367882 A1 Dec. 18, 2014

(30) Foreign Application Priority Data
Nov. 3, 2011 (DE) .......................... 102011085735.4

(51) Int. Cl.
*B29C 55/06* (2006.01)
*B29C 55/18* (2006.01)
*B29C 55/12* (2006.01)
*B29C 35/08* (2006.01)

(52) U.S. Cl.
CPC .............. *B29C 55/06* (2013.01); *B29C 55/12* (2013.01); *B29C 55/18* (2013.01); *B29C 2035/0811* (2013.01); *B29C 2035/0822* (2013.01)

(58) Field of Classification Search
CPC .............................. B29C 55/06; B29C 55/065
See application file for complete search history.

(56) References Cited

U.S. PATENT DOCUMENTS

| | | | |
|---|---|---|---|
| 3,161,711 A | 12/1964 | Tassler | |
| 3,165,499 A | 1/1965 | Alles et al. | |
| 3,347,960 A * | 10/1967 | Fenley | B29C 48/92 264/40.6 |
| 2009/0036667 A1* | 2/2009 | Hashimoto | B29C 55/045 536/69 |

(Continued)

FOREIGN PATENT DOCUMENTS

| | | |
|---|---|---|
| DE | 102009045593 | 4/2011 |
| DE | 102009046592 | 5/2011 |

(Continued)

*Primary Examiner* — Christopher T Schatz
(74) *Attorney, Agent, or Firm* — Jacobson Holman PLLC

(57) ABSTRACT

A device and a method for extending a film web along a longitudinal direction thereof include guiding the film web in a travel direction over several rollers, and extending the film web in at least one straining gap which is limited by at least two rollers operated with different circumferential speeds. The web is provided with a temperature gradient, which extends in the direction perpendicular relative to the longitudinal axis of the film web.

14 Claims, 5 Drawing Sheets

(56) References Cited

U.S. PATENT DOCUMENTS

2010/0283191 A1* 11/2010 Takahata ................. B29C 55/06
264/555
2011/0006452 A1    1/2011 Bayer et al.
2012/0186615 A1    7/2012 Hering et al.
2012/0299209 A1   11/2012 Trommelen et al.

FOREIGN PATENT DOCUMENTS

| EP | 0 715 943 | 6/1996 |
|----|-----------|--------|
| EP | 2277681 | 1/2011 |
| GB | 1419972 | 12/1975 |
| WO | WO 2006/130142 | 12/2006 |

* cited by examiner

STRAINING DEVICE AND METHOD FOR EXTENDING A FILM WEB

CROSS-REFERENCE TO RELATED APPLICATION

This is a national stage of PCT/EP12/071160 filed Oct. 25, 2012 and published in German, which has a priority of German no. 102011085735.4 filed Nov. 3, 2011, hereby incorporated by reference.

BACKGROUND OF THE INVENTION

1. Field of the Invention

The invention relates to a straining device and a method for extending film webs. Films are extended with devices of this type. In this context the word extending represents straining or stretching film webs.

2. Description of Related Art

For this purpose, various types of straining devices have become known. The straining devices discussed in the context with the present publication are characterized in a plurality of rollers, with the film webs to be extended being guided over them. Here, the film webs are guided both over individual guide rollers as well as through roller gaps. Some of these rollers form so-called straining gaps. The film web is extended in these straining gaps by the circumferential surfaces of consecutive rollers being moved with increasing speeds in the direction of transportation of the film. The publications DE 10 2009 046 592 A1 and DE 10 2009 046 593 A1 show devices of this type. In the devices shown here it is particularly striking that the extension occurs only along the longitudinal direction of the film webs (mono-axial straining or extending). In these devices the longitudinal direction of the film webs coincides with the direction of transportation. Film webs develop as a result of a treatment with the above-mentioned devices, which increase in their length in the longitudinal direction. Via the extension process in many plastics, particularly polyalkylene, mechanical features of the film webs are improved. These features include primarily the tensile strength of the film webs in the direction of their extension. In this processing method it is disadvantageous, though, that the film webs fail to gain any stability or tensile strength in the spatial directions perpendicular in reference to the longitudinal direction. In addition to these known and desired results of the straining or extension processes, which are well known to one trained in the art of plastics technology, particularly by the extension of wide film webs, so-called neck-in processes are triggered. A neck-in process leads to the extended film being thicker at the edge of the film web than in its center. This condition is undesired. For this reason, the publication EP 2 277 681 A1 suggests to design the profile of the film already during the film production such that the sections of the width of the film web, which later are located at the edges of the extended film webs, are produced considerably thinner. This way, the negative consequences of this neck-in phenomenon (thick film edges) shall be counteracted. The disadvantages of the above-stated process include that it is suggested with regards to a blown film plant. In such a blown film plant initially a film hose is extruded from an annular gap nozzle. Normally, the profile of the blown film hose is optimized to a constant thickness, optimized over the circumference of the film hose. For the purpose of controlling the thickness profile of the blown film hose, frequently controlled cooling rings are used here. In the method presented in the above-stated publication it is necessary to generate a thin section as early as during the extrusion of the film hose at the position of the circumference of the hose at which the film hose is opened with a blade. Such a thin section shall be generated according to the above-mentioned publication by a controlled cooling ring of the blown film plant in the area of the later thin section, generating a higher temperature than in the other sections of the circumference of the film hose. However, this measure requires a high heating power in the area of the thin section and/or an appropriately high cooling power in the other sections.

This way, the listed measures require stronger cooling or heating devices than normally used in blown film plants. Furthermore, the embossing of a thin section by a renewed supply of heat into a still hot film melt, which subsequently needs to be cooled again, shows disadvantages in process technology.

For the above-mentioned reasons the objective of the present invention comprises to correct the disadvantages mentioned.

This objective is attained by the features of the invention described herein.

SUMMARY OF THE INVENTION

The invention therefore teaches to use devices for impinging the film webs with a temperature gradient in a straining device. The disadvantages with regards to process technology of prior art are avoided this way. Furthermore, it is possible to use more efficient and more directly acting devices for transferring temperature in the straining device. The additional supply of temperature or an additional cooling occurs in the blown film plant generally using air. This air is required directly after the extrusion of the film melt in the blown film plant in order to cool the melt or the film, which is still hot. Further cooling or heating measures, deviating from the goal of the production of a film showing a homogenously thick profile, lead to complications with regards to process technology in the blown film plant itself. Furthermore, the adjusting force and/or the amount of adjusting force of the film thickness control for embossing an inhomogeneous profile of film thickness is consumed when the teaching of EP 2 277 681 A1 is used. A displacement of a temperature treatment, regardless of its design, into the straining device as provided by the present invention, avoids these problems, though. If the straining device discussed here is actually used for straining film webs, i.e. when the film to be strained has already cooled after being extruded in order to then be strained, then a greater temperature difference can be generated within the film than in a film being melted and/or extruded. Of course, this also applies for films produced in flat film extrusion plants. Accordingly, the straining device according to the invention and the method according to the invention can also be used beneficially for the further processing of flat film webs. Straining devices according to the invention can directly extend flat or blown films which have just been extruded without the respective film being stationary and/or, for example, being stored on a film winding core. In addition to such in-line further processing, of course an off-line further processing is possible, in which the extruded film is subjected to an interim storage before being fed to the straining device.

Even if an extension process shall be performed with the straining device, i.e. even if the film has not cooled completely after its production before it is once more extended, the sensitivity of the film, and particularly that of the film surface, is considerably lower than directly after its extrusion.

As already mentioned, the extension process occurs in the straining gaps, which are located between at least two rollers operating with different circumferential speeds. The rollers limiting the straining gap are generally parts of pairs of rollers, i.e. the film travels through the roller gap prior and/or after reaching the straining gap. With the pressure in the roller gap the risk of any slippage of the film webs on the driven roller is lower than in case of a single roller. Consequently, the web is subjected to a stronger and more homogenous longitudinal force during the straining process.

It is advantageous that at least parts of the devices for impinging the film webs with a temperature gradient along the direction of transportation of the film webs are positioned directly ahead of the straining gap. In particular, when the introduction of the temperature gradient coincides with a renewed introduction of temperature, it should be avoided that the reheated film is guided with its more sensitive surface over multiple rollers before it is fed for the purpose of transportation through the straining device in order to be extended. Alternatively or additionally, at least parts of the devices for impinging the film webs with the temperature gradients may be integrated in the rollers of the straining device. The rollers further embodied in this fashion may represent rollers which limit the straining gap. Here, it is advantageous when the first roller in the film travel direction or the first pair of rollers which limit a straining gap in the film travel direction is/are formed in this fashion. Rollers, which in the context with the present invention can be used advantageously, may be segmented. For example, the respective roller may show perhaps a rubberized metallic surface, with the surface being divided into annular metallic segments, with insulating elements being inserted between them or simply with a clearance being given. The above-mentioned annular metallic elements may be heated via suitable heating elements [arranged] inside the rollers. Such heating elements include heating cartridges.

However, it is also possible to indirectly heat the roller components using induction methods or radiation methods. Frequently different tempering devices are provided in the various straining devices. Here, frequently an already completely cooled film web is retempered, which may mean that the film web is brought to a straining temperature using heating devices, which may include hot oil baths, with said temperature frequently being only slightly below the extrusion temperature. Particularly in the context with such straining devices, it is advantageous when parts of the width of the web are cooled by the application of the method according to the invention. A cooling of the film web is particularly beneficial in the central section, seen in the direction of the film width. Here, water may be used for cooling the web. However, it is also possible to provide rollers, which can be tempered sectionally, with pelletizing elements. Here, hot or cold air may also represent a potential tempering device. The respective tempering air may be blown against the film webs, for example by the use of fans and nozzles.

In a method according to the invention, the film webs are provided with a temperature gradient which extends in the direction perpendicular in reference to the longitudinal axis of the film webs. This measure is taken while the film webs are transported by the rollers. This way, the method is implemented in a straining device. As already mentioned, the temperature will generally be higher in the external sections of the traveling film webs than in the center of the web. As an alternative or in addition to the measures relating to the temperature of the web, measures may be taken impacting the web mechanically. These measures include that at least one roller involved in the formation of a roller gap is positioned in reference to another roller such that the pressure applied upon the web in the roller gap is at least higher at a side of the web than at the other sections of the respective width of the web. This may occur by a particular design of the cross-section of this roller; however, it is also possible to position the axes of the rollers in reference to each other in a manner deviating from being parallel. This way, first one side of the film webs and then the other one in another roller gap can be impinged with a higher pressure.

Another possibility for influencing is given in varying the friction between the film web and the surface of the rollers of the straining device in the axial direction of the rollers, thus providing them with a gradient. The film web itself may also be provided with different friction properties over its width.

In this way, the friction properties of the circumferential areas of the rollers may be varied over the axial length of the roller. Advantages can be achieved particularly when the stiction between the film web and the axial ends of the rollers is higher than the respective stiction in the center of the roller and/or the film web.

Another advantageous measure comprises using rollers which are provided with a surface, particularly at their axial ends, as normally used for width-adjusting rollers. Width-adjusting rollers are shaped such that they transfer force upon the film web transported on the width-adjusting roller during contacting between the film web and the width-adjusting roller, which act in the axial direction of the width-adjusting roller and/or in the direction perpendicular in reference to the direction of transportation of the film webs.

Additional exemplary embodiments of the invention are discernible from the graphic description and the claims.

BRIEF DESCRIPTION OF THE DRAWINGS

The individual figures show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
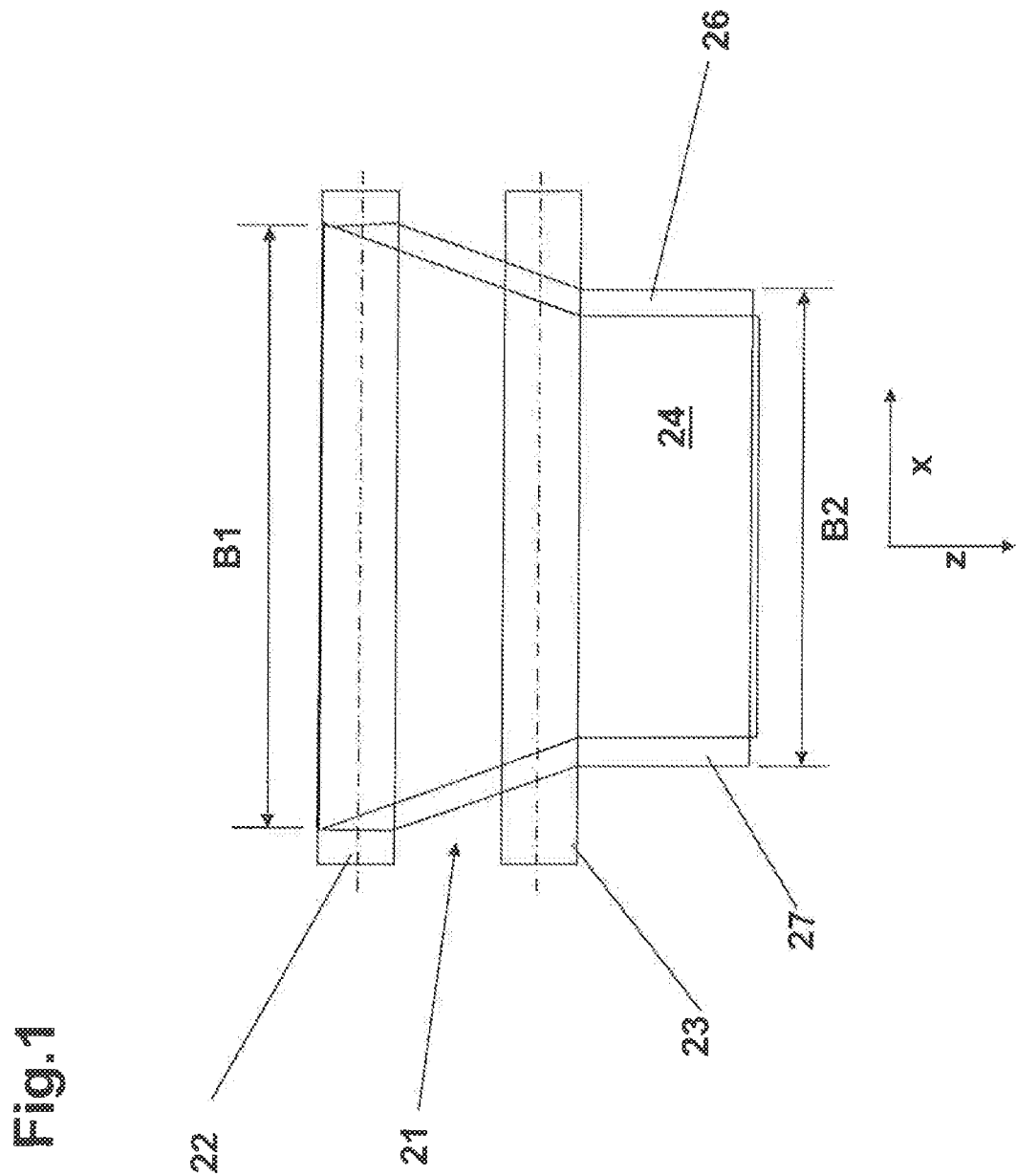
Figure 2:
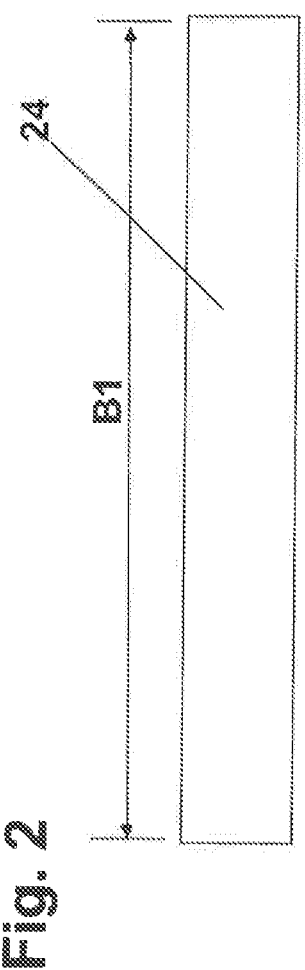
Figure 3:
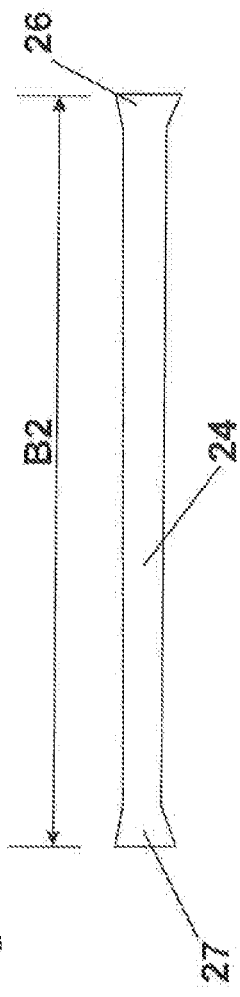
Figure 4:
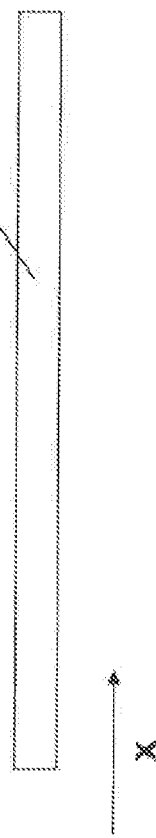
Figure 5:
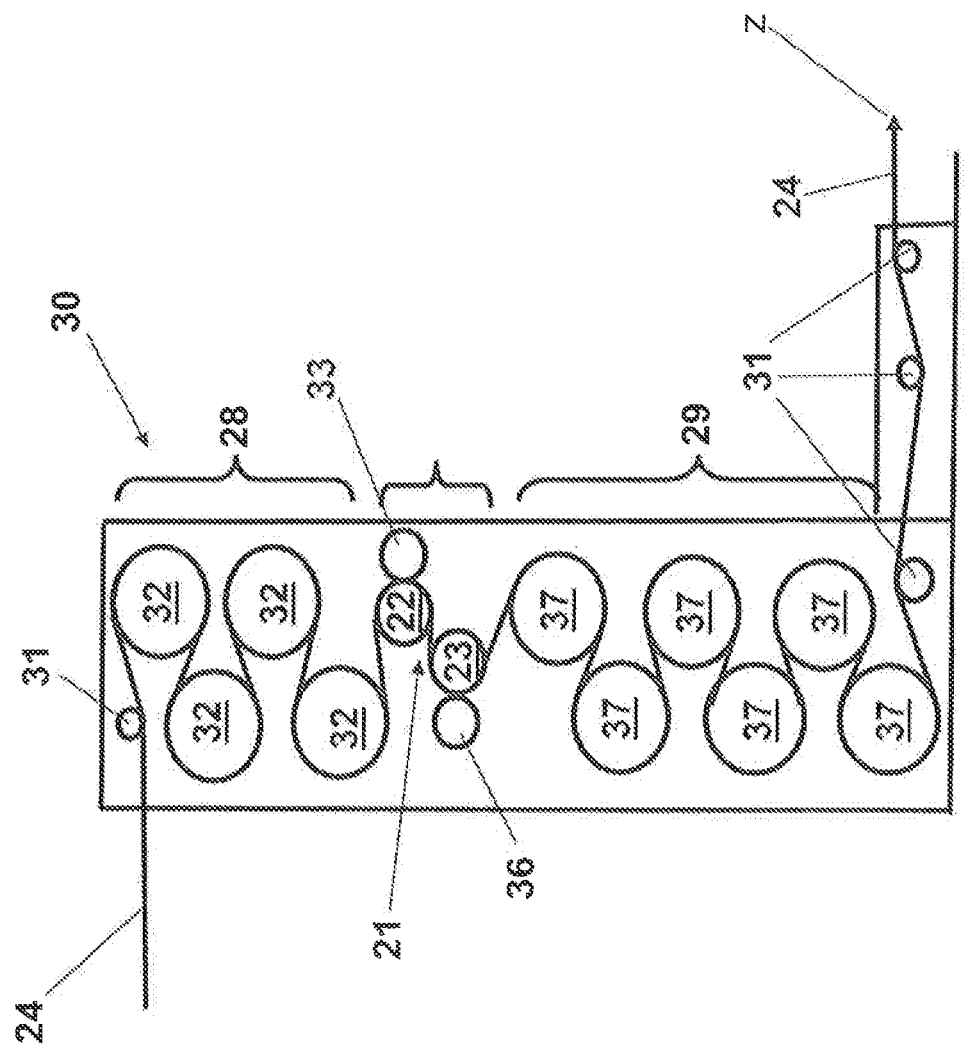
Figure 6:
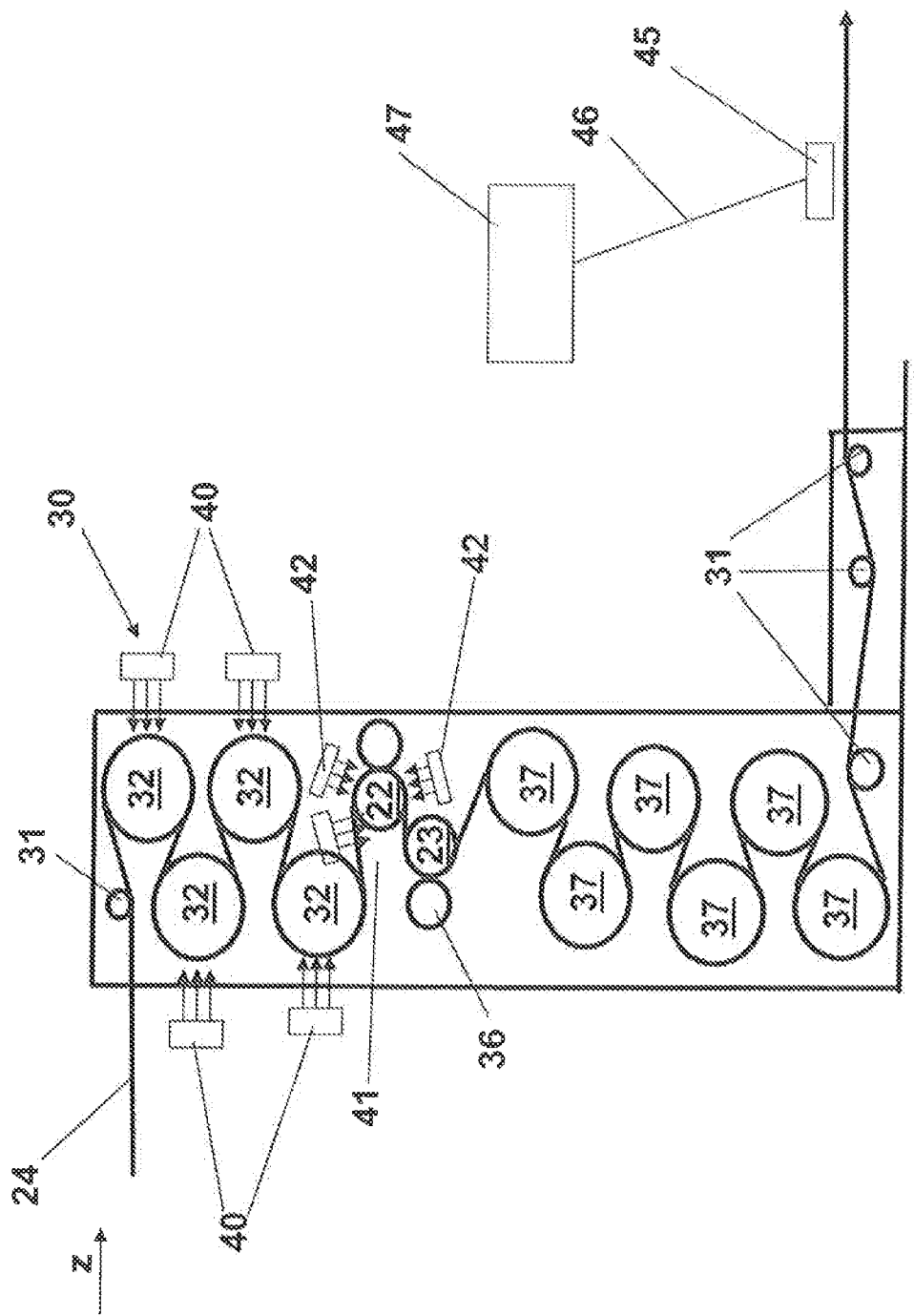
Figure 7:
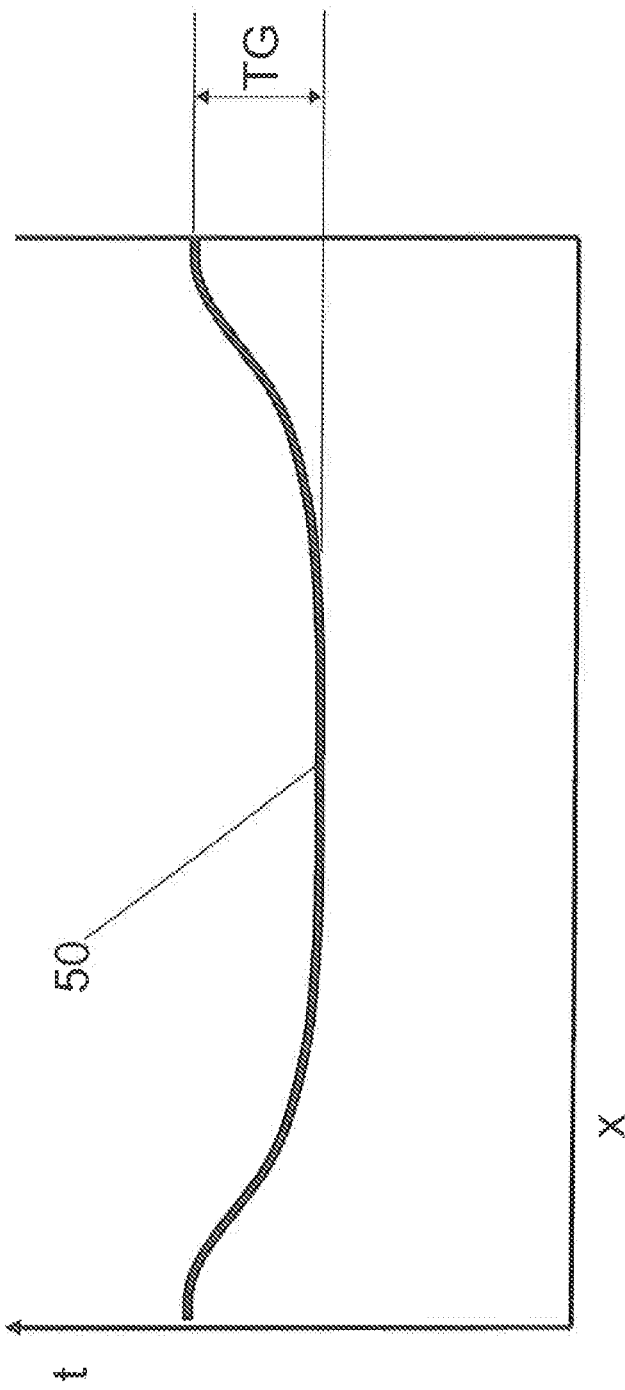

FIG. 1 a sketch of a straining gap
FIG. 2 the cross-section of an unextended film
FIG. 3 the cross-section of an extended film
FIG. 4 the desired cross-section of an extended film
FIG. 5 a straining device according to prior art
FIG. 6 a straining device according to the invention
FIG. 7 a distribution of the film temperature over the width of the film FIG. 1 shows a sketch of a straining gap 21, which is limited by the rollers 22 and 23. The film web 24 introduced into the level of the image first wraps around the roller 22, which shows a first circumferential speed. The film web 24 then passes through the straining gap and finally reaches the surface of the roller 23, which 23 shows a circumferential speed which is higher than the circumferential speed of the roller 22. Due to the difference in the circumferential speeds, the web 24 is extended in the straining gap 21. FIG. 1 shows that the width of the film webs 24 tapers by the above-mentioned extension process from the width B1 to the width B2. The edge sections 27 and 26 of the film web 24 are shown differently than the areas in the center of the web 24 in order to illustrate the neck-in of the film 24, displayed in the following. The FIGS. 2 through 4 show different film profiles and this way contribute to the understanding of the neck-in process. FIG. 2 shows the profile of a new film 24 prior to the straining. FIG. 3 shows the profile of an extended film 26, which shows in the edge sections 27 and 26 a greater film thickness than in the central area. FIG. 4 once more shows a film profile with a homogenous thickness and this way symbolizes a film profile which is desired by the film manufacturer from its extended film as well.

FIG. 5 shows a sketch of the function of a straining device 30 of prior art. The film webs 24 travel along a film travel direction z into the straining device 30. Here it is first guided from the guide roller 31 to the heating rollers 32, respectively marked with the reference character 32. The objective of the heating rollers 32 comprises returning the partially or completely cooled film web 24 back to a temperature which is sufficient for a straining or extension process. Straining devices of prior art generally perform straining processes, i.e. the film is already cooled and needs to be brought back to the straining temperature. Extension processes, which are used for example during the blown film extrusion, are found rather rarely in the use of straining devices, but they are possible (particularly when the straining device follows inline in reference to a film extrusion plant).

In particular, when an extrusion plant is arranged directly downstream in reference to the straining device according to the invention, i.e., when the straining occurs "in-line," it should be possible to call it a straining process even in connection with a straining device. However, this is more of a question of definition than one of technology.

After the film web 24 has been returned to a straining temperature in the area of the heating rollers 28, it travels into the area of the straining rollers 22 and 33 and passes through the gap between these two rollers 22, 33. Subsequently, the film web 24 passes through the straining gap 21 in order to then reach the surface of the straining roller 23 and leave the straining gap 21. This straining roller 23 once more forms a roller gap together with the straining roller 36. The film web 24 is extended in the roller gap 21 by the above-mentioned different circumferential speeds of the first pair of rollers 22, 33 in reference to a second pair of rollers 23, 36.

The film web 24 then reaches the area 29 of the cooling rollers, respectively marked with the reference character 37, in which the film web 24 is cooled again. After leaving this area 29, the film web 24 once more shows a slightly lower temperature, so that its surface can easily withstand the transportation over the guide roller 31 in the direction of transportation z without any damages, and finally can be supplied for example to a winding place, not shown, or a machine for further processing, not shown either.

FIG. 6 shows a sketch of the function of a straining device 30, which has been further developed according to the teaching of the invention. The functional components of this straining device 30 already known to one trained in the art, such as the heating rollers 32 and the cooling rollers 37, are marked with the same reference characters as the respective functional components of the straining device 30 in FIG. 5. In addition to these functional components, various devices are indicated in FIG. 6, though, for impinging the film web 24 with a temperature gradient. These devices are described in the following:

Following the path of the film web 24 through the straining device 30 in the film travel direction z, first the magnetic field generators 40 are noticeable, which are in an operating position in reference to the heating rollers 32. These magnetic field generators 40 generate alternating magnetic fields. Here, the distance assumed by these magnetic field generators in reference to the roller surface is shorter than it appears in FIG. 6. Via the alternating magnetic field, eddies are induced underneath the film webs 24 and underneath the rubberized coating, not shown, of the heating roller 32, with its interior being made from metal, so that the surface of the roller heats up. This functional principle is also known from induction stoves. The heating rollers 32 of the straining device 30 shown in FIG. 6 are segmented in the axial direction x of the rollers 32, and the respective segments, following each other in the axial direction, are thermally and electrically separated from each other.

The magnetic field generators 40 are also segmented in the axial direction x of the rollers 32, equivalent to the direction x in which the width of the film web 24 runs. This way it is possible to feed a special thermal energy to each axial segment of a heating roller 32 and in this fashion to provide a temperature gradient to the roller surface. As an alternative or in addition to this type of heating, the heating rollers 32 may also be equipped in their interior with additional heating devices. These heating devices may once more be arranged and thermally connected to the roller surface such that they separately heat individual axial roller segments, or they may be embodied as a joint heating device of the respective roller. In the first case, these additional heating devices would also be considered devices for impinging the film web 24 with a temperature gradient. In the latter case, the use of the heating devices would be beneficial in order to bring all sections of the width of the film web to a sufficient straining temperature.

The next devices for impinging the film webs with a temperature gradient, apparent in the film travel direction z on the path of the film web 24 through the straining device 30, are represented by the infrared radiators 42. The infrared radiators 42 are also segmented along the direction x and can this way introduce a temperature gradient into the film web 24. The area of effect of the infrared radiators 42 is directly located upstream in the film travel direction at the start of the straining gap 21. This is advantageous. Here, distances are recommended from the gap between the rollers 22 and 33 which are shorter than 40 cm. Even more advantageous are distances which are shorter than 30 or 20 cm. At the outlet of the gap between the rollers 22 and 33, the film web 24 comes into the range of influence of additional infrared radiators 42. No additional information is required about the functionality of the infrared radiators. Advantageously, they are arranged such that the web is located in the range of influence of the infrared radiators 42 when leaving the roller 22.

The next devices for impinging the film web with a temperature gradient, located on the path of the film web 24, are hot-air nozzles 41. These 41 directly target the film web 24 on its path through the straining gap 21. By the extrusion of air with different temperatures along the width x of the web 24 and/or by the extrusion of different air volumes per unit of length of the width of the web, here also a temperature gradient can be impressed into the film web 24 along its width x.

Finally, the film web 24 reaches the gap between the rollers 36 and 23 and leaves the straining gap 21. The film web 24 then reaches the area 29 of the cooling rollers 37, which 29 is generally designed as known from prior art. However, it may also be advantageous to cool to a greater extent those sections of the film web 24, which have been heated to a stronger extent in the area of the heating rollers 32 or the straining gap 21. Accordingly, it is also advantageous here for the cooling power impinging the film web 24 to be designed differently in the axial segments of the rollers 37 and/or along the width of the film. The remaining functional components of the straining device 30 operate in the same fashion as already described in FIG. 5 in reference to the straining device 30.

FIG. 7 shows an advantageous progression 50 of the film temperature t along the spatial direction x of the film width. Such an even progression of the film temperature T at both sides of the film web along the direction x of the film width is particularly advantageous when the device has been operating for an extended period of time under these conditions and yields satisfactory results. FIG. 6 shows how the results of the control of the film thickness can be monitored in the straining device 30. Here, a sensor device 45 monitors the film thickness. In order to monitor the film thickness profile of a film being extruded a number of sensor devices are known. For example, there are capacities for sensors, but it is also possible to measure the transmission of radiation (for example infrared radiation or beta radiation). Due to the fact that the film web 24 is placed flat in the measuring range of the sensor device 45 it is suggested to use a sensor device which traverses along the width of the film. The sensor device 45 can communicate its measurements via the signal line 46 to the control device 47. The control device may represent a component of the machine computer, which can control various functional components of the straining device 30. This way, using the above-mentioned functional components 45, 46, and 47, a control of the thickness of the film and/or of the profile of said film thickness can occur based on a target value. For example, the control device 47 may forward control commands based on thickness profiles measured by the control device to the various devices for generating a temperature gradient via signal lines, not shown, or modern communication devices, such as WLAN-networks. This way, the control device may increase, for example, the film temperature in an area of the film width x when the film thickness exceeds a target value. In the inverse situation, the control device may reduce the heating power or issue control commands to cooling elements in order to reduce the temperature of the film. Another component of the computer-implemented control method shown may include the adjustment of the traveling speed of the film through the straining device 30.

It seems advantageous to reduce the traveling speed of the film when the deviations of the film thickness from a target value exceed a threshold. This way, the devices for impinging the film web 24 with a temperature gradient can be granted more time for adjusting the temperature.

It is also advantageous in such a case to maintain the straining ratio, i.e. the ratio between the circumferential speeds of the rollers limiting the straining gap or gaps 21. This way, it is possible to react quickly even in case of major fluctuations of the film thickness, continue with the film production, and yield a good film quality. Particularly in the most-recently described case it is recommended to provide web storage devices between the film extrusion plant and a straining device 30 according to the invention, when the film extrusion plant and the straining device 30 shall continue in the in-line operation. From the above-stated facts it can also be concluded that the present invention can also be advantageously used for straining devices 30 with several straining gaps 21.

At this point it must be mentioned once more that it has proven advantageous to introduce the temperature gradient directly into the film web while it is being transported between two rollers. Here, such a temperature impingement within the straining gap itself is particularly advantageous.

Another advantageous option for a further development of the invention can be achieved by the use of rollers in the straining device, which are provided with a temperature isolating layer on their surface. Such rollers advantageously limit the straining gap at the location where the web enters said gap.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

List of reference characters 1
2 Straining gap
3 (first) roller (in the film travel direction), limiting the straining gap
4 (second) roller (in the film travel direction), limiting the straining gap
5 Film web/web
6
7 Right edge section of the web
8 Left edge section of the web
9 Area of the heating rollers
10 Area of the cooling rollers
11 Straining device
12 Guide roller
13 Heating roller
14 Straining roller
15
16
17 Straining roller
18 Cooling roller
19
20
21 Magnetic field generator
22 Hot-air nozzle
23 Infrared radiator
24
25
26 Sensor device
27 Signal line
28 Control device
29
30
31 Progression of the film temperature over the width of the film (graph)
32
33
34
35
36
37
38
39
40
41
B1 Width of the unextended web
B2 Width of the extended web
z Film travel direction
x Spatial direction perpendicular in reference to the film travel direction
t Film temperature
TG Temperature gradient

What is claimed is:

1. A blown film web straining device for extending a blown film web along a longitudinal direction (z) thereof, said blown film web straining device comprising:
   a plurality of rollers, over which the blown film web is guided in a transport direction along the longitudinal direction (z);
   a straining gap provided by at least a first roller and a second roller of the plurality of rollers, with the first roller and the second roller being separated from each other by a distance along a path of blown film web transport in the transport direction, with the first roller and the second roller being drivable with circumferential speeds that differ from one another; and
   a plurality of devices for impinging the blown film web with a temperature gradient that extends in a direction (x) perpendicular relative to the longitudinal direction (z) of the blown film web, the temperature gradient including a first temperature on a first side of the blown film web in the direction (x), a second temperature on a second side of the blown film web in the direction (x), and a middle portion in between the first side and the second side in the direction (x), with a temperature at the middle portion being less than both the first temperature and the second temperature,
   with the plurality of devices for impinging the blown film web with the temperature gradient including at least one of a magnetic field generator and a plurality of hot air nozzles, and
   with the plurality of hot air nozzles being located so as to introduce the temperature gradient directly into the blown film web while the blown film web is being transported within the straining gap,
   the temperature gradient being applied so as to use the first temperature on the first side of the blown film web in the direction (x) and the second temperature on the second side of the blown film web in the direction (x) to reduce an increased thickness of the blown film web at the first side of the blown film web and at the second side of the blown film web which arises during the extending of the blown film web, relative to a thickness of the blown film web at the middle portion thereof.

2. The blown film web straining device according to claim 1, wherein at least parts of the devices for impinging the blown film web with the temperature gradient are provided upstream in the transport direction of the blown film web relative to the straining gap.

3. The blown film web straining device according to claim 1, wherein at least parts of the devices for impinging the blown film web with the temperature gradient are components of at least one of the rollers, over which the blown film web is guided.

4. The blown film web straining device according to claim 1, wherein at least one of the devices for impinging the blown film web with the temperature gradient is a component of at least one of the rollers that define the straining gap.

5. The blown film web straining device according to claim 1, wherein at least one of the devices for impinging the blown film web with the temperature gradient is a component of at least one of the rollers that define the straining gap, and is located upstream relative to the straining gap in the blown film web transport direction.

6. The blown film web straining device according to claim 1, wherein at least one of the devices for impinging the blown film web with the temperature gradient is one of the rollers of the plurality of the rollers, which is differently tempered in an axial direction thereof.

7. The blown film web straining device according to claim 1, wherein at least one of the devices for impinging the blown film web with the temperature gradient is a cooling device.

8. The blown film web straining device according to claim 1, wherein at least one of the devices for impinging the blown film web with the temperature gradient is at least one of a temperature radiator and an induction device.

9. The blown film web straining device according to claim 1, wherein at least one of the rollers includes a circumferential surface, such that a stiction thereof changes in an axial direction of the roller.

10. The blown film web straining device according to claim 1, wherein the plurality of hot air nozzles create the temperature gradient by applying air with different temperatures.

11. The blown film web straining device according to claim 1, wherein the plurality of hot air nozzles create the temperature gradient by applying different volumes of air.

12. The blown film web straining device according to claim 1, wherein the straining device that extends the blown film web is employed as part of a blown film web extrusion process.

13. The blown film web straining device according to claim 1, further comprising a control system that controls operation of at least one of the plurality of devices for impinging the blown film web with the temperature gradient.

14. The blown film web straining device according to claim 13, wherein the control system includes a sensor that detects the increased thickness of the blown film web at the first side of the blown film web and at the second side of the blown film web, a controller that assesses the thicknesses of the blown film web detected by the sensor, and a signal line that communicates a signal from the controller to the at least one of the plurality of devices for impinging the blown film web with the temperature gradient so as to control the operation of the at least one of the plurality of devices, and thereby control the thickness of the blown film web at the first side of the blown film web and at the second side of the blown film web.

* * * * *